United States Patent
Dearnley et al.

[11] Patent Number: 5,301,599
[45] Date of Patent: Apr. 12, 1994

[54] PISTONS WITH RING GROOVE REINFORCING

[75] Inventors: Timothy Dearnley, Huddersfield; Simon Gazzard, Skipton, both of United Kingdom

[73] Assignee: AE Piston Products Limited, England

[21] Appl. No.: 825,051

[22] Filed: Jan. 24, 1992

[30] Foreign Application Priority Data

Feb. 2, 1991 [GB] United Kingdom ............... 9102324

[51] Int. Cl.⁵ .................................................. F16J 1/04
[52] U.S. Cl. ........................................ 92/222; 92/223; 92/231; 92/260; 123/193.6; 29/888.04; 29/888.042; 29/888.044; 29/888.049
[58] Field of Search ................... 29/888.04, 888.042, 29/888.044, 888.047, 888.048, 888.049; 92/222, 223, 208, 231, 260; 123/193.6

[56] References Cited

U.S. PATENT DOCUMENTS

| | | | |
|---|---|---|---|
| 2,550,879 | 5/1951 | Stevens, Jr. | 92/222 |
| 2,905,512 | 9/1959 | Anderson | 309/44 |
| 3,539,192 | 11/1970 | Prasse | 277/224 |
| 4,997,024 | 3/1991 | Cole et al. | 29/888.048 X |
| 5,094,149 | 3/1992 | Munro | 29/888.04 X |

FOREIGN PATENT DOCUMENTS 1044596 10/1966 United Kingdom .

Primary Examiner—Thomas E. Denion
Attorney, Agent, or Firm—Nixon & Vanderhye

[57] ABSTRACT

Pistons and a method for their manufacture are described. The piston has at least one piston ring groove reinforcing member being annular in form and having, in cross-section, upper and lower, generally radially extending face portions and a radially inner, generally axially extending face portion between the two generally radially extending face portions, the generally axially extending face portion being coated with particulate material by a physical vapor deposition technique, to provide a porous adhesion assisting layer.

23 Claims, 2 Drawing Sheets

PISTONS WITH RING GROOVE REINFORCING

The present invention relates to pistons having an encast piston ring groove reinforcement therein, and to a method of preparing such reinforcements prior to incorporating them into pistons.

BACKGROUND AND SUMMARY OF THE INVENTION

Pistons having a reinforcing member in the top piston ring groove position are well known. Such members are used to reduce mutual wear between the piston ring groove and the co-operating piston ring. Frequently, where aluminium alloy pistons are concerned, the reinforcing member is made from a cast-iron such as Ni-resist (trade mark) in order to minimise the difference in coefficient of linear thermal expansion between the piston material and the material of the reinforcing member. In piston production, the reinforcing member is usually positioned within a female die mould member and molten aluminium alloy poured around the member. If the piston is being gravity die cast or pressure cast, the member is frequently pretreated by the well known Alfin (trade mark) process whereby it is preheated in a bath of molten aluminium to produce a wetted layer which includes aluminium-iron intermetallic compounds at the interface. A problem with this is that the bond formed between the piston material and the reinforcing member is very brittle and in-service failures of the bond in highly rated diesel engines, for example, are not uncommon.

An improvement over the Alfin technique is disclosed in GB-A-2,221,176 wherein the reinforcing member is first coated with a layer such as a stainless steel powder by a physical vapour deposition process such as plasma spraying, for example. The technique described involves coating at least those faces of the member which are contained within the body of the cast piston. The casting technique employed is pressure casting such as by squeeze-casting, for example. A problem with this method is that each individual reinforcing member needs to be sprayed on at least three faces, when viewed in cross-section, the faces being upper and lower, axially spaced-apart, radially directed faces and a radially inner, generally, axially directed face joining the two radially directed faces. This technique requires either manipulation of the reinforcing member or of the plasma spraying equipment and is time and materials consuming and, therefore, relatively expensive.

However, the method described does give an increase in bond strength of up to 100% over the earlier Alfin technique and a consequent increase in in-service durability of the bond.

We have now discovered that it may not be necessary in every application to coat every face of the reinforcing member which is contained with the piston body. We have found that it may only be necessary to coat the generally axially directed face to secure a significant improvement in in-service durability of the bond between the member and the piston body, over that of the earlier Alfin technique.

According to a first aspect of the present invention there is provided a piston having therein at least one piston ring groove reinforcing member, the at least one reinforcing member being annular in form and having, in cross-section, upper and lower, generally radially extending face portions and a radially inner, generally axially extending face portion between the two generally radially extending face portions, the generally axially extending face portion initially being coated with particulate material by a physical vapour deposition technique to provide a porous adhesion assisting layer, subsequently piston body alloy being cast around the reinforcing member and infiltrating the porous layer.

For the purpose of definition, the term generally axially extending face portion is defined relative to the piston axis and, the face portion may, for example, be planar, curved or may have two or more facets and may be taken to include the area adjacent the junction with the two generally radially directed face portions. The reinforcing member may, for example, be rounded in cross-section and may not have clearly defined boundaries to the face portions. In this case, the face portions may comprise arcs of the rounded cross section periphery with no clearly defined boundary therebetween.

The reinforcing member may be of rounded cross section; and may be of such a form as to reinforce two piston ring grooves with a single member.

According to a second aspect of the present invention there is provided a method of making a piston having at least one piston ring groove reinforcing member, the at least one reinforcing member having upper and lower, generally radially extending face portions and a generally axially extending face portion between the two generally radially extending face portions and radially inwardly of the piston outer diameter, the method comprising the steps of coating with particulate material the generally axially extending face portion by a physical vapour deposition technique to form a porous adhesion assisting layer, preheating the coated reinforcing member, placing the reinforcing member in a piston casting die, pouring molten piston body alloy around the reinforcing member, and allowing the molten alloy to solidify under an applied pressure causing the alloy to infiltrate the porous layer.

The thickness of the adhesion assisting layer may preferably lie in the range from 0.025 mm to 0.3 mm and more preferably from 0.05 mm to 0.15 mm, but is not considered to be particularly critical. At greater thicknesses the cost of deposition increases unnecessarily for no gain in bond strength and at lower thicknesses the full potential bond strength may not be developed.

The upper and lower, generally radially extending face portions may be bonded to the cast part of the piston body by being provided, after the provision of the coating of particulate material, with a wetted layer which includes an aluminium-iron intermetallic compound at the interface therewith. In such circumstances, the two generally radially extending face portions are, in effect, being treated by the Alfin technique. Thus, before the coated reinforcing member is placed in the piston casting die, the reinforcing member is dipped into a bath of molten aluminium to wet the upper and lower generally radially extending face portions. The coated reinforcing member may be preheated before being placed in the piston casting die by being dipped in the bath of molten aluminium for a time sufficient for the reinforcing member to be brought to the temperature of the bath.

We have found that the Alfin type bond is, in most instances adequate in compression and tension but inferior in shear. Therefore, the radially directed faces may be Alfin bonded but the axially directed face needs an improved bonding technique of the type described in GB-A-2,221,176. It has been found that crack initiation at the bond usually occurs at the axially directed face and may propagate to the radially directed faces.

The particular material may be oxidation; and/or corrosion; resistant, for example, stainless steel, e.g. 316L type. The corrosion resistance may be necessitated if preheating in a bath of molten aluminium is employed.

The adhesion assisting layer may be of a porous ferrous material, for example, the porosity stemming from the method of deposition.

Methods of physical vapour depositing the coating may include arc spraying, or plasma spraying, or flame spaying, for example.

Preferably, two or more reinforcing members, which are generally in the form of annular rings, are held together in an axial stack and in such an assembly are coated on their radially inner, generally axially extending face portions. The coating of the generally axially directed face may be effected by traversing a plasma spray gun, for example, mutually axially with respect to the rings whilst the stack and plasma gun are mutually rotated. Since a stack of reinforcing members may be coated simultaneously, the cost and inconvenience of the coating step may be greatly reduced, thus making the cost of piston manufacture more economical.

In order that the present invention may be more fully understood, examples will now be described by way of illustration only with reference to the accompanying drawings.

BRIEF DESCRIPTION OF THE DRAWINGS

Referring now to FIGS. 1 to 6 of the drawings and where the same features, here and in subsequent figures, have common reference numerals.

DETAILED DESCRIPTION OF THE DRAWINGS

Figure 1:
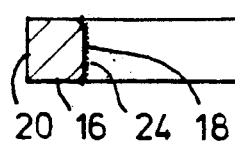
FIG. 1 shows a section through a reinforcement member.
Figure 4:
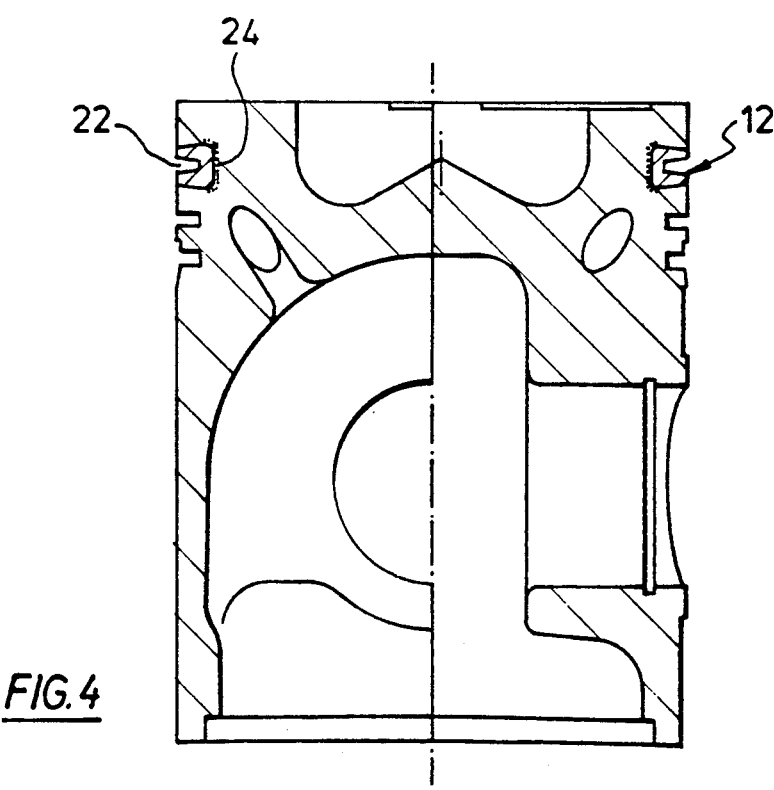
FIG. 4 shows an axial section in two planes, normal to each other, of a piston having a reinforcement member.

FIG. 1 shows a reinforcing member 12, known commonly as a "ring carrier". The ring carrier, in this instance, is made from an austenitic cast-iron such as Ni-resist (trade mark) and is generally positioned in the top ring position as shown in the piston sections of FIG. 4. The ring carrier 12 is annular in form, having an upper, generally radially directed face portion 14, a lower, generally radially directed face portion 16, a radially inner and generally axially directed face portion 18, and a radially outer axially directed face 20 in which one or more piston ring grooves 22 are usually subsequently formed. Hereinafter the term "face portion" will be abbreviated to "face". The generally axially directed face 18 is coated with an adhesion assisting layer 24; "adhesion assisting" referring to assisting the adhesion of the ring carrier to the subsequently cast piston material. In this instance the layer may be 316L stainless steel powder deposited by plasma spraying to a thickness of 0.1 mm. The surface 18 may be prepared in a conventional manner for plasma deposition; one method including the steps of degreasing followed by grit blasting to produce a clean, matt appearance on the surface.

Figure 2:
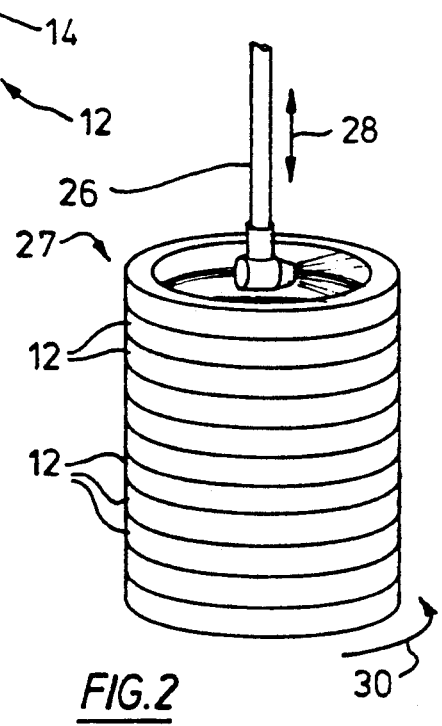
FIG. 2 shows a perspective schematic view of a stack of reinforcement members being coated.

In order to coat a plurality of ring carriers as shown in FIG. 2, a plasma spray gun 26 is traversed up and down a stack 27 of the ring carriers, in the axial direction as indicated by the arrow 28 whilst the stack is rotated by drive means (not shown) in the direction of the arrow 30. The number of traverses of the gun 26 is dependent upon the thickness of the layer 24 it is desired to produce on the ring faces 18. The ring carriers 12 may be easily separated from each other due to the fragility of the relatively thin layer 24 at the junctions 32 (see FIG. 3) between the ring carriers.

Figure 5:
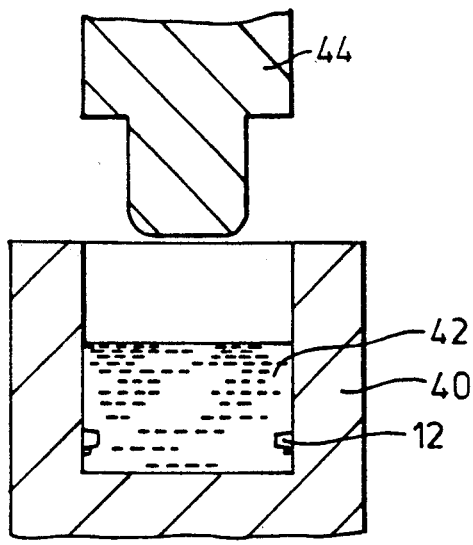
FIGS. 5 and 6 show schematic sections through a squeeze-casting die.
Figure 6:
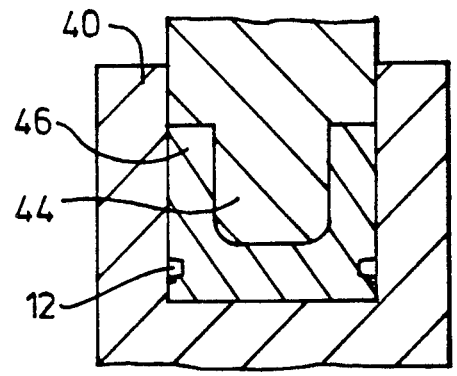

Then the ring carrier is preheated and is placed into the female portion 40 of the piston casting die shown in FIGS. 5 and 6. Molten piston body alloy is poured into the die, which is closed with a male die member 44 to produce a squeeze-cast piston blank 46. In this step the molten piston body alloy is caused to infiltrate the porous layer 24.

Before the ring carrier is placed into the female portion 40 of the die, the coated ring carrier may be dipped into a bath of molten aluminium (not shown), to wet the faces 14 and 16, so forming an aluminium-iron intermetallic compound at the interface therewith. After the ring carrier is cast into the remainder of the piston body the faces 14 and 16 are caused to be bonded at 48 (shown in FIG. 7) to the remainder of the piston body by the presence on the faces of the aluminium-iron intermetallic compound at the interface. The ring carrier may be pre-heated by the time the ring carrier is dipped in the bath being such that the ring carrier is brought to the temperature of the bath. Then the still-hot ring carrier is placed into the female portion 40 of the piston casting die.

Figure 7:
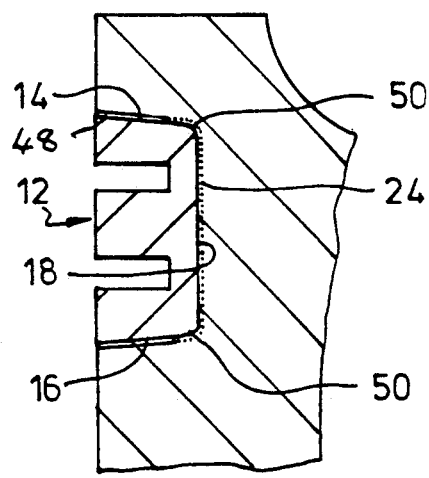
FIG. 7 shows a section of part of a piston having an alternative reinforcing member.
Figure 8:
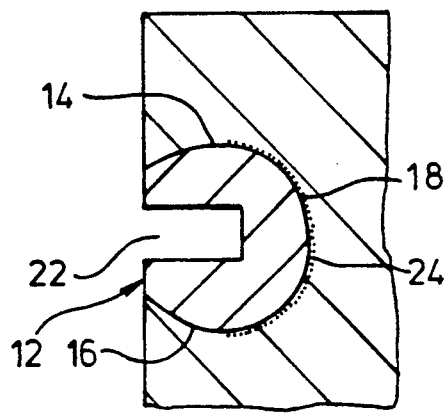
FIG. 8 shows a section similar to FIG. 7 having another alternative reinforcing member.

FIG. 7 also shows an alternative piston ring carrier wherein the dimensions are of sufficient size to allow the formation of two piston ring grooves 22 in the face 20. It is desirable, for the reduction of stress concentration and consequent crack initiation, to provide radiused corners 50 at the junctions of the faces 14, 16 and 18 and as shown in other Figures. It is, therefore, implicit that when defining that only the generally axially extending face 18 is coated with an adhesion assisting layer 24, that this term also includes any radii at the junctions between faces. This principle is further exemplified in FIG. 8 where the cross-sectional shape of the ring carrier member is rounded and there is no clearly delineated junction or boundary between radially and axially directed faces. The main criteria, therefore, for defining what is a "generally axially directed face" is that area which can be coated by a coating technique which is deposited in the radial direction.

Figure 3:
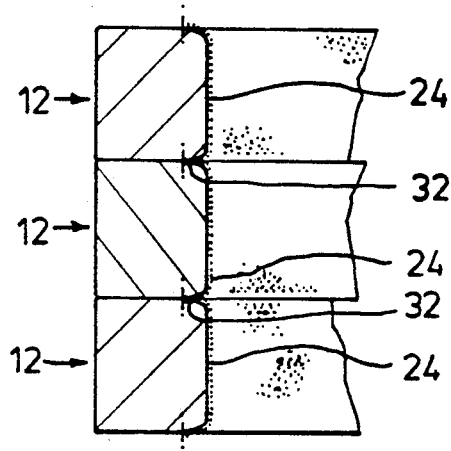
FIG. 3 shows a section through part of the stack of FIG. 2.
Figure 9:
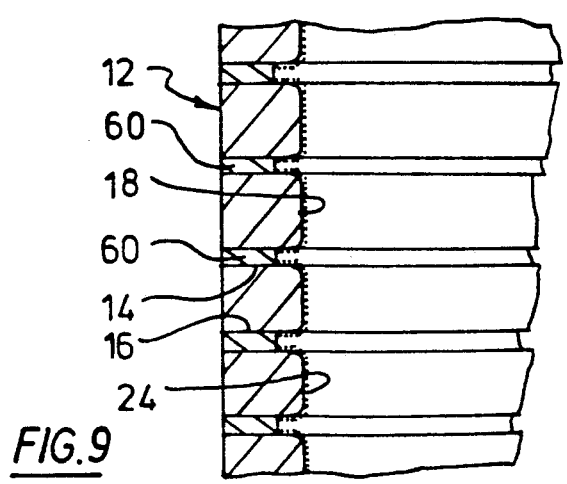
FIG. 9 shows a section similar to FIG. 3 of an alternative stack arrangement.

FIG. 9 shows part of an alternative stack arrangement wherein the ring carriers 12 are separated by spacers 60 to allow easier separation of the rings by removing the closely adjacent junctions 32 (see FIG. 3).

We claim:

1. A piston having therein at least one piston ring groove reinforcing member, the at least one reinforcing member being annular in form and having, in cross-section, upper and lower, generally radially extending face portions and a radially inner, generally axially extending face portion between the two generally radially extending face portions, only the generally axially extending face portion being coated with particulate material by a physical vapour deposition technique to provide a porous adhesion assisting layer, a piston body alloy being cast around the reinforcing member in engagement with said radially extending face portions and infiltrating said porous adhesion assisting layer.

2. A piston according to claim 1 wherein the thickness of the adhesion assisting layer lies in the range from 0.025 to 0.3 mm.

3. A piston according to claim 2 wherein the thickness of the adhesion assisting layer lies in the range from 0.05 to 0.15 mm.

4. A piston according to claim 1 wherein the particulate material is oxidation resistant.

5. A piston according to claim 1 wherein the particulate material is corrosion resistant.

6. A piston according to claim 1 wherein the adhesion assisting layer is of a porous ferrous material layer.

7. A piston according to claim 6 wherein the porous ferrous layer is of stainless steel.

8. A piston according to claim 1 wherein the reinforcing member is of rounded cross section.

9. A piston according to claim 1 wherein the reinforcing member has two piston ring grooves.

10. A piston having therein at least one piston ring groove reinforcing member, the at least one reinforcing member being annular in form and having, in cross-section, upper and lower, generally radially extending face portions and a radially inner, generally axially extending face portion between the two generally radially extending face portions, the generally axially extending face portion initially being coated with particulate material by a physical vapour deposition technique to provide a porous adhesion assisting layer, a piston body alloy being cast around the reinforcing member in engagement with and radially extending face portions and infiltrating the porous layer; wherein the upper and lower, generally radially extending face portions are bonded to the cast part of the piston body by being provided, after the provision of the coating of particulate material, with a wetted layer which includes an Aluminium-Iron intermetallic compound at the interface therewith.

11. A method of making a piston having at least one piston ring groove reinforcing member, the at least one reinforcing member having upper and lower, generally radially extending face portions and a generally axially extending face portion between the two generally radially extending face portions and radially inwardly of the piston outer diameter, the method comprising the steps of coating with particulate material only the generally axially extending face portion by a physical vapour deposition technique to form a porous adhesion assisting layer, preheating the coated reinforcing member, placing the reinforcing member in a piston casting die, pouring molten piston body alloy around the reinforcing member including the generally axially extending face portion and the radially extending face portions, and allowing the molten alloy to solidify under an applied pressure causing the alloy to infiltrate said porous adhesion assisting layer.

12. A method according to claim 11 wherein the thickness of the adhesion assisting layer lies in the range from 0.025 to 0.3 mm.

13. A method according to claim 12 wherein the thickness of the adhesion assisting layer lies in the range from 0.05 to 0.15 mm.

14. A method according to claim 11 wherein the particulate material is oxidation resistant.

15. A method according to claim 11 wherein the particulate material is corrosion resistant.

16. A method according to claim 11 wherein the adhesion assisting layer is of a porous ferrous material.

17. A method according to claim 16 wherein the porous ferrous material is of stainless steel.

18. A method according to claim 11 wherein the physical vapour deposition technique is plasma spraying.

19. A method according to claim 11 wherein the physical vapour deposition technique is flame spraying.

20. A method according to claim 11 wherein the physical vapour deposition technique is arc spraying.

21. A method according to claim 11 wherein a plurality of the annular reinforcing members are held together in an axially directed stack and in such an assembly are coated on their radially inner, generally axially extending face portions.

22. A method of making a piston having at least one piston ring groove reinforcing member, the at least one reinforcing member having upper and lower, generally radially extending face portions and a generally axially extending face portion between the two generally radially extending face portions and radially inwardly of the piston outer diameter, the method comprising the steps of coating with particulate material the generally axially extending face portion by a physical vapour deposition technique to form a porous adhesion assisting layer, preheating the coated reinforcing member, placing the reinforcing member in a piston casting die, pouring molten piston body alloy around the reinforcing member, and allowing the molten alloy to solidify under an applied pressure causing the alloy to infiltrate said porous adhesion assisting layer; wherein, before the coated reinforcing member is placed in the piston casting die, the reinforcing member is dipped into a bath of molten Aluminium to wet the upper and lower generally radially extending face portions, so forming an Aluminium-Iron intermetallic compound at the interface therewith.

23. A method according to claim 22 wherein the coated reinforcing member is preheated before being placed in the piston casting die by being dipped in the bath of molten aluminium for a time sufficient for the reinforcing member to be brought to the temperature of the bath.

* * * * *